May 1, 1934.  A. WHITE  1,956,603
AQUOLYSIS OF EMULSIONS
Filed July 2, 1930
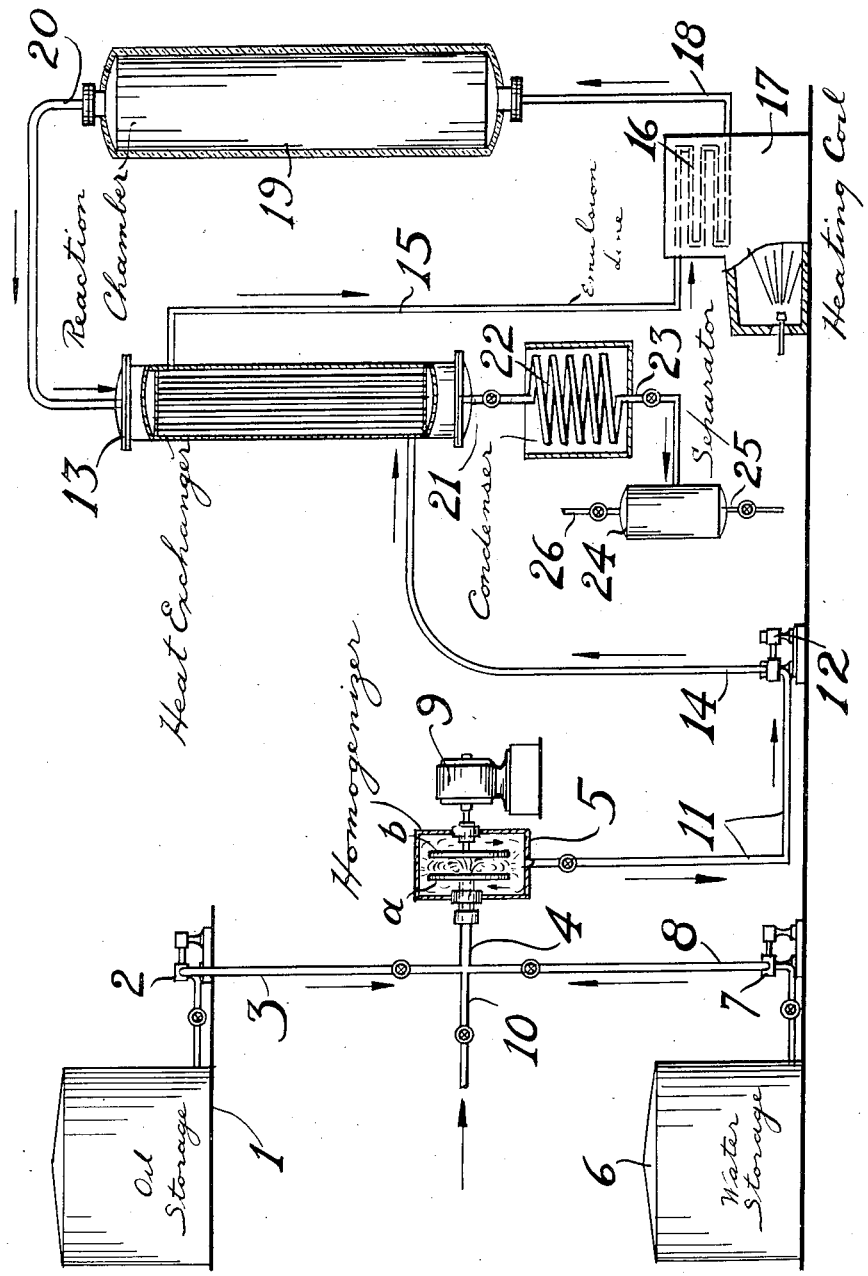
Abraham White Inventor
W. E. Currie Attorney Patented May 1, 1934

1,956,603

UNITED STATES PATENT OFFICE 1,956,603

AQUOLYSIS OF EMULSIONS

Abraham White, Dorchester, Mass., assignor to Standard Oil Development Company, a corporation of Delaware Application July 2, 1930, Serial No. 465,451

5 Claims. (Cl. 196—64)

When mineral oil and water are brought together in certain molecular ratios and are subjected to a brief exposure to a relatively high temperature and pressure a reconstitution of the oil is brought about with the production of liquids of lower boiling point and other changes, the result being that from oils of low value liquid products arise which possess a higher value and enjoy a broader market. Such treatment has been designated aquolysis.

Aquolysis is usually conducted as a continuous or noncumulative operation, a stream of oil and a stream of water in aquolyzing proportions being forced into and through a heated aquolyzing zone or region of reaction where the mingling of the oil and water allows the desired molecular readjustment of the oil to obtain, together with such chemical action between oil and water as may occur under the specified conditions.

While on a small experimental scale there is little difficulty in establishing an intimate mix of the streams of oil and water, with sufficient rapidity to permit of the encompassing effect of the water in the aquolyzing zone, the conditions are different when operating on a larger scale and the problem of securing rapid admixture may present considerable difficulty.

Also, when using separate streams of oil and water two or more pumping or forcing apparatus are required with corresponding cost of installation and additional labor cost of inspection, and so forth.

The present invention is directed to the conduct of aquolysis with the employment of emulsions or dispersions of oil and water or aqueous material.

The drawing is a diagrammatic representation of one type of apparatus suitable for the herein described process.

A suitable oil is withdrawn from any suitable source, such as tank 1, and is forced by pump 2 and lines 3 and 4 into a homogenizer 5, which will be described below. Water is concurrently drawn from suitable source such as tank 6 and is forced by pump 7 and lines 8 and 4 into the homogenizer 5. This homogenizer may be of any suitable design and may consist, for example, of opposed plates rotated in opposite directions at high speed by suitable means such as an electric motor 9. A suitable emulsifying agent may be supplied in admixture or solution with the oil or water, as desired, or may be separately added to the mixing line 4 by line 10. The resulting emulsion is withdrawn from the homogenizer by line 11 and may be forced by a high pressure pump 12 through line 14 and heat exchanger 13 in indirect heat exchange with the products of the reaction. The emulsion then passes through line 15 and fired coil 16 arranged in a suitable coil setting 17, and then by line 18 into reaction chamber 19. This chamber is designed of suitable materials to withstand the high temperatures and pressures and the corrosive effect of the reagents used. It is preferably lagged to prevent undue loss of heat and may be heated directly, if desired, by suitable means such as electric heaters (not shown). The reaction products then pass through line 20, heat exchanger 13 and line 21 through cooler and condenser 22, and then by line 23 to separator 24. The liquid products may be withdrawn through line 25 and may be separated and sent to storage or treated further, as desired. A vent for the uncondensed gases is provided at 26.

In general terms when carrying out the invention the oil and water are simply emulsified prior to introduction into the aquolyzing zone and the intimate mixture thereby secured is passed into said zone, for which purpose only one pumping apparatus is required in place of the two pieces of apparatus which normally would be used when separate streams are to be handled.

With oil and water thus intimately mixed the entry of the mixture into the aquolyzing zone permits of a better orientation of the desired reactions, as will be later more fully discussed.

The oils which I preferably use in the process are various heavy petroleum hydrocarbons and distillates of differing specific gravities and qualities, including crude oil, fuel oil, gas oil and other distillates therefrom, tars and tarry oils, shale oils and also natural emulsions of mineral oils. The invention will be illustrated by employing gas oil as a raw material for emulsion aquolysis, but it should be understood that no limitations are to be inferred by such illustrative use, since various other oils as indicated may be employed in like manner as desired.

The water required for aquolysis should preferably be soft so that mineral matter will not be deposited on the walls of the aquolyzing chamber and form objectionable encrustations. When a catalyst is employed in said chamber it is especially important to use soft water in order that the catalyst may not be quickly fouled.

A volume of water equal to or usually in excess of that of the oil generally is used in aquolysis. The emulsion therefore normally is one of the oil-in-water type. Sometimes, however, I may find it advantageous to use an emulsion of the water-in-oil type. Natural emulsions of petroleum frequently are available for the purpose. In general an encompassing proportion of water should be used, that is, one which enables the molecules of water to well surround the molecules of oil and space them so that each molecule may perform its reconstitutional change without undue collision with other oil molecules.

As a dispersing agent an alkaline solution preferably is used, the natural acids of the oil being adequate to bring about emulsification or dispersion, especially if the product is passed through a colloid mill or homogenizer. Ordinary soaps may be used if desired, a relatively small proportion, for example, 1 part of soap to 800 or 1000 parts of oil usually being adequate. The employment of ammonia soaps is desirable because the ammonia volatilizes and does not leave mineral deposits in aquolyzing chamber. An emulsion may be made, for example, by using 1 part of soap to 800 or 900 parts of gas oil and 5700 parts water, the proportions being by weight. The mixture made from these is passed through a homogenizer at room temperature and the emulsion thereby obtained is drawn by a pumping apparatus and forced through the aquolyzing zone.

When natural emulsions are employed it may be necessary to change the dispersion from water-in-oil to the oil-in-water type in view of the frequent occurrence of natural emulsions in the former state.

The temperature of emulsion aquolyzation preferably ranges from 900° F. to 1300° F., or even higher, preferably, employing pressures from below 100 atmospheres up to many hundred atmospheres or even 1,000 atmospheres and higher; 200 atmospheres being a good operating pressure, especially within the temperature range 1000° F. to 1250° F. Temperatures and pressures above the critical preferably are used in emulsion aquolysis.

As stated, the process of aquolysis is preferably continuous, although I do not limit myself thereto and may conduct the operation intermittently by batch methods in some cases. The continuous process, however, enables a large throughput, readily accommodates heat exchange and preheating apparatus and provides a better control of time of contact in the aquolyzing zone.

The period of contact, that is, the subjection to the action of heat in presence or absence of catalyzers preferably is short, at the most under preferred conditions of operation not exceeding a few seconds or one or two minutes; the time of contact being somewhat dependent upon the size of the apparatus, quality of the oil, proportion of water, degree of dispersion, and the like.

Condensation may be carried out at the same pressure used in aquolysis or the pressure may drop to atmospheric, or condensation may be carried out at intermediate pressures.

The products of emulsion aquolysis, especially when the operation is carried out at the higher range of temperatures, consist in very large measure of lighter hydrocarbons which have properties indicative of their value as motor fuels, also an aqueous extract containing small quantities of alcohols, ketones, acids and other oxygenated substances produced by reaction of hydrocarbon with water. The aqueous and oily portions are best separated before further treatment takes place. This may be readily carried out by gravity separation. The oily distillate containing the lighter hydrocarbons may then be subjected to distillation to permit separation into fractions having boiling points in different ranges as desired. The aqueous portion may be treated to recover the oxygenated bodies mentioned or analogous ones, all according to the yields available.

In the four following examples gas oil was used of a specific gravity at 23° C. 0.845, aniline point 68.5° C., and mean molecular weight, calculated from distillation curve, approximately 215 (note that temperatures herein referring to analytical data are given as °C., while the temperature of aquolysis and the distillation point of motor fuel are in °F. These two thermometric units are thus employed in customary manner in the oil industry).

*Example 1.*—Approximate molecular ratio water to oil 18:1 in the emulsion, temperature of aquolyzing zone 1250° F., pressure 3,000 lbs., and time of contact in the aquolyzing zone 13.4 seconds. The products of reaction on an inlet basis, that is, on the quantity of oil introduced into the aquolyzing zone, were found in this case to be 3.8 per cent of oil converted to gas, 77.5 per cent of oil converted to liquid hydrocarbons of motor fuel type boiling below 435° F., with aniline point 37° C. and bromine number 17. Oil as residue amounted to 19.7 per cent.

*Example 2.*—In this case a lower pressure, namely, 2,000 lbs., while a higher proportion of water to oil, namely, in the ratio of 34.5:1 mol in the emulsion was used. The time of contact in the aquolyzing zone at a temperature of 1250° F. was 12 seconds. The products on an inlet bases were 12 per cent oil converted to gas, 70.5 per cent oil converted to motor spirit or gasoline of boiling range below 435° F., and 17.5 per cent oil as residue.

*Example 3.*—Aquolyzing temperature of the emulsion 1250° F., pressure 2,000 lbs., water to oil ratio 34.5:1 mol and time of contact 14 seconds, that is slightly longer than in Example 2. The products in this case on an inlet basis were 15.3 per cent oil conveyed to gas, 73.8 per cent oil converted to motor fuel or gasoline of the same end point as indicated above. The oil residue amounted to 10.1 per cent. The aniline point of the motor fuel was 37° C. and the bromine number 25.

*Example 4.*—Temperature of aquolyzation of the emulsion 1,000° F., pressure 3,000 lbs., ratio of water to oil 80:1 mol., time of contact was 65 seconds. The products on an inlet basis were 5.5 per cent oil to gas, 92.8 per cent oil to motor spirit or gasoline boiling below 435° F., this motor fuel having an aniline point of 41° C., a bromine number of 18 and a specific gravity 0.728. Oil in the form of residue amounted to 3.8 per cent, possessing a specific gravity of 0.844 at 20° C. In this and other examples gas is taken by difference and therefore includes loss unaccounted for.

*Example 5.*—In this case gas oil of a lower grade was used having a specific gravity of 0.875 at 20° C., an aniline point of 68° C. and mean molecular weight, calculated from distillation curve, approximately 268. Temperature in the aquolyzing zone to which the emulsion was subjected 1250° F., pressure 2,000 lbs., time of contact 14 seconds, ratio of water to oil 34.5:1 mol. The products figured on the inlet basis were 7.9 per cent oil converted to gas, 75.5 per cent oil converted to motor spirit or gasoline of boiling point up to 435° F., with an aniline point of 47° C. and bromine number 19.4. 14.5 per cent of oil remained as residue from the distillation in the separation of the motor fuel, this residue having a specific gravity of 0.878 and aniline point of 64° C.

In this example it will be noted that the specific gravity of the oil residue is approximately the same as that of the gas oil supplied in the emulsion feed. Tarry bodies were not present in the residue. The substantial absence of tars and tarry oils is indicative of little if any conversion of the oil to heavier products by polymerization or other reactions which tend to build up hydrocarbons of higher molecular weight. In pyrolytic cracking it is well known thermal decomposition of this type while yielding light hydrocarbons, at the same time produces a material yield of heavier hydrocarbons or polymers, tarry bodies, pitch and similar residues. Many of these heavy hydrocarbons are extremely difficult to break down into light products. By the heat treatment to which they have been subjected they have acquired an undesirable degree of stability. The present invention permits of reconstitution of the oil without formation of undesirable and intractable polymers, while allowing a major proportion of the oil to be converted into light liquid hydrocarbons of the motor fuel type and yielding only a minor and usually relatively small proportion of gas and an oily residue usually substantially of a non-tarry nature, frequently, resembling the original unaquolyzed petroleum oil, at least in a general way.

What I claim is:

1. The process of converting heavy petroleum oil into low boiling hydrocarbons, which comprises forming an emulsion of the heavy oil and water containing at least 50% water, subjecting this emulsion to temperatures between 1000°–1250° F. and a pressure of about 200 atmospheres, and recovering low boiling hydrocarbons from the products of this treatment.

2. Process according to claim 1, in which the emulsion of oil and water is subjected to treatment with high temperature and pressure for a time less than two minutes.

3. Process according to claim 1, in which the emulsion of oil and water is subjected to treatment at the high temperature and pressure for a time between a few seconds and two minutes.

4. The process of converting heavy petroleum oil into lighter liquid hydrocarbons, which comprises emulsifying the heavy oil with several volumes of water, subjecting the emulsion to temperatures and pressures above the critical point, and recovering from the products of this treatment lighter hydrocarbons produced thereby.

5. Process according to claim 4, in which the emulsion of oil and water is subjected to temperatures and pressures above the critical point for a time less than two minutes.

ABRAHAM WHITE.